United States Patent [19]

Buisson et al.

[11] Patent Number: 4,988,995
[45] Date of Patent: Jan. 29, 1991

[54] DISPLAY DEVICE WITH MULTIPLE RETRACTABLE FLAT SCREENS

[75] Inventors: Jean-Michel Buisson, Colombes; Jean-Marie Soubrier, Gentilly, both of France

[73] Assignee: Thomson CSF, Paris, France

[21] Appl. No.: 203,159

[22] Filed: Jun. 7, 1988

[30] Foreign Application Priority Data

Jun. 12, 1987 [FR] France .................... 87 08188

[51] Int. Cl.⁵ .................................. G01C 21/00
[52] U.S. Cl. ........................ 340/971; 40/473; 340/700; 340/765
[58] Field of Search ............. 340/971, 973, 974, 975, 340/980, 705, 717, 713, 764, 765, 700, 425.5; 362/62; 40/446, 448, 452, 456, 463, 564, 572, 574, 577, 473; 116/46, 51, 52, 54

[56] References Cited

U.S. PATENT DOCUMENTS

| | | | |
|---|---|---|---|
| 2,050,635 | 8/1936 | Summers | 116/46 |
| 3,399,402 | 8/1968 | Brown, Jr. | 340/713 |
| 3,947,986 | 4/1976 | Page | 40/572 |
| 4,067,128 | 1/1978 | Kempster | 40/572 |
| 4,203,094 | 5/1980 | Sowa et al. | 340/425.5 |
| 4,310,832 | 1/1982 | Fitzgerald | 40/577 |
| 4,371,870 | 2/1983 | Biferno | 340/716 |
| 4,598,292 | 7/1986 | Devino | 340/973 |
| 4,603,495 | 8/1986 | Stevens | 40/446 |
| 4,615,131 | 10/1986 | Wakatake | 340/764 |
| 4,845,495 | 7/1989 | Bollard et al. | 340/945 |

FOREIGN PATENT DOCUMENTS 0165838 12/1985 European Pat. Off. .

Primary Examiner—Jospeh A. Orsino
Assistant Examiner—Brent A. Swarthout
Attorney, Agent, or Firm—Cushman, Darby & Cushman

[57] ABSTRACT

The display device of the invention includes several flat screens. Two sides of a case each form a flat screen display face controlled by the same control system. Under normal operation, the case is held in slides and only the screen disposed on one side is visible and in the emergency mode the case is pulled out of the slides and is pivoted so as to cause the other screen disposed on the othr side to appear.

6 Claims, 2 Drawing Sheets

FIG_1
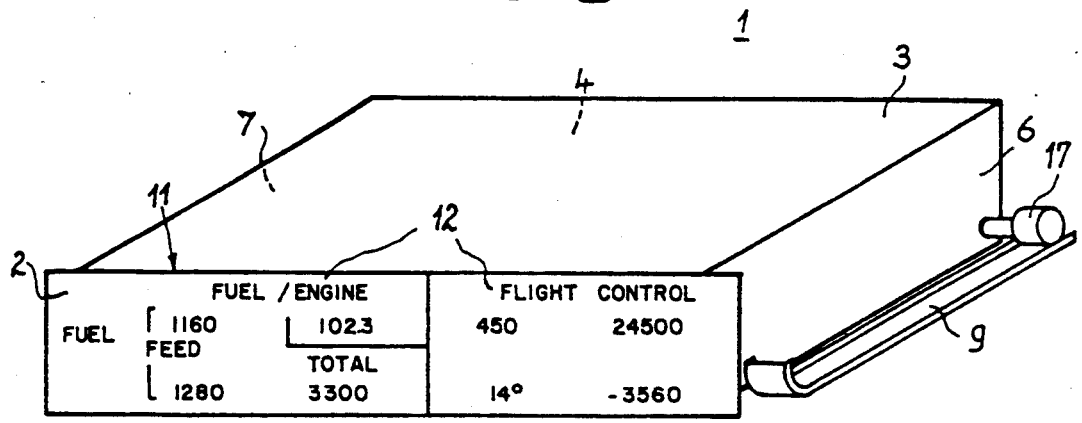
FIG_2
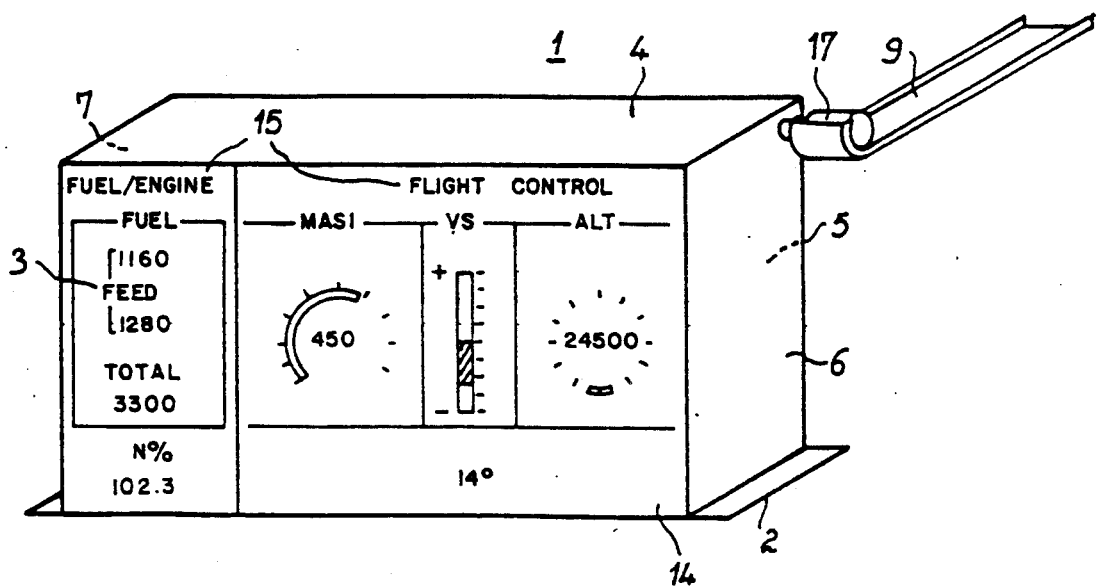

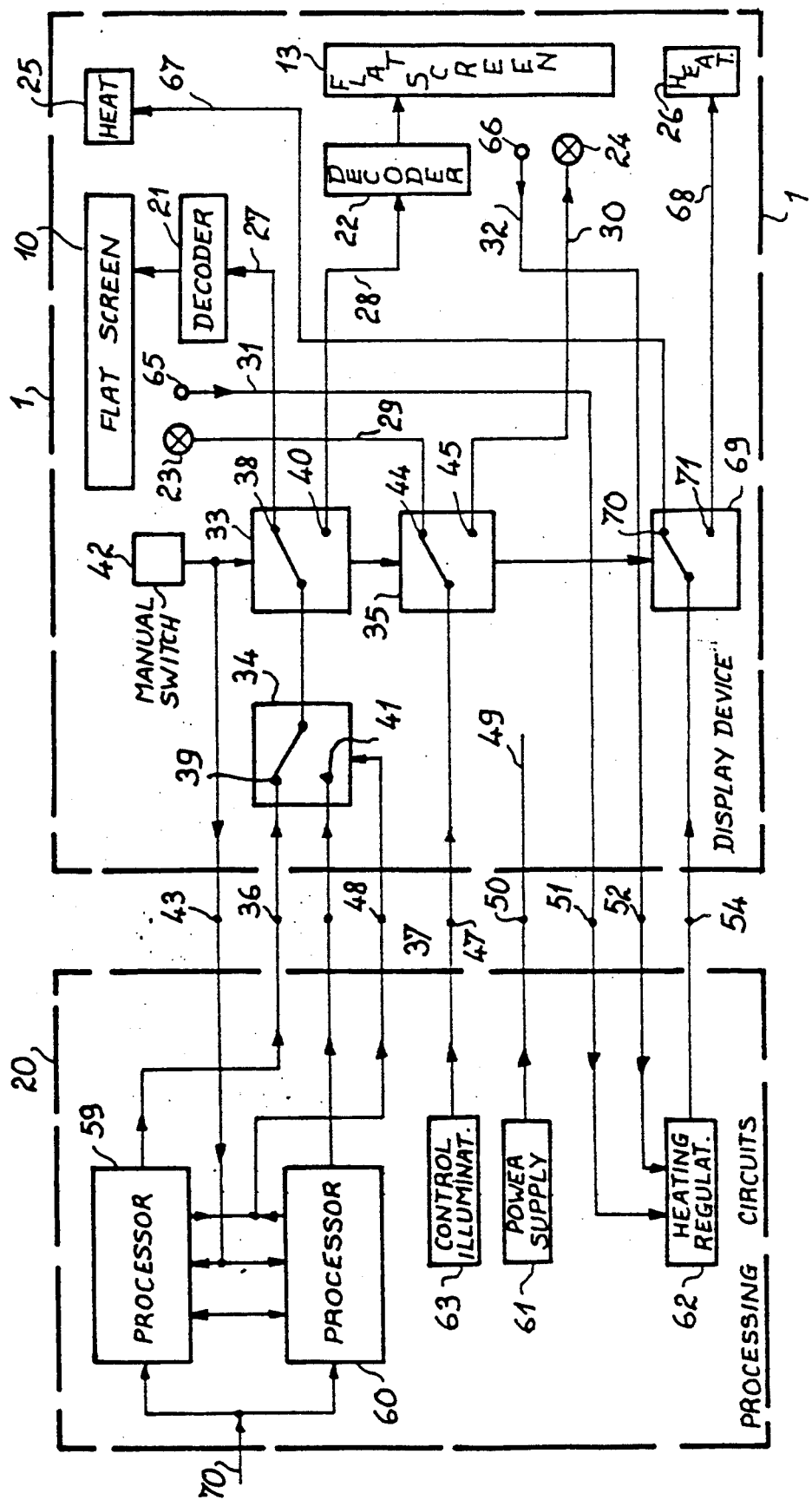
FIG_3

DISPLAY DEVICE WITH MULTIPLE RETRACTABLE FLAT SCREENS

BACKGROUND OF THE INVENTION

The invention relates to display devices comprising several flat screens, particularly those for use in aircraft, operating either in a normal operational mode or in an emergency mode.

In aircraft, the display of information such as variables and operating parameters of the different equipment on board is provided not only by traditional instruments such as graduated dials, counters, display units, etc. but also, by images obtained with cathode ray tubes, plasma screens, light emitting diodes, liquid crystal or light emitting panels. With such image display devices, several parameters can be presented on the same surface, either simultaneously, successively, or at the request of the operator, which reduces the number of traditional instruments on the instrument panel.

One advantage of such image devices is that they can be placed a distance away from the electronic circuits which control the image formation and/or the information display, which facilitates positioning thereof in the position best adapted for the operator.

The two aspects mentioned above, namely display on the same screen of multiple different information and the remote control of the display of said information, lead to a better use of the available volume, which volume is generally reduced to a maximum in an aircraft, particularly in the proximity of the pilot of the aircraft.

SUMMARY OF THE INVENTION

The purpose of the invention is to form and combine display devices so as to make better use of the volume reserved for displaying information.

Another object is to form display devices which have a first display face serving as instrument for normal operation and a display face for operation at the request of the operator, particularly in the emergency mode, this latter face being retracted during normal operation.

More generally, the object of the invention is to provide display devices having several flat screens disposed on several faces of the same case, which screens are chosen by the operator or which are presented automatically to the operator should particular events happen such as a failure.

The invention relates to an information display device comprising a parallelepipedic shaped case, at least two flat screens each disposed on one of the sides of said case, means for fixing and pivotally mounting the case so as to present the appropriate screen to the operator, means for forming signals for controlling the screen so as to display the information on one of the two screens and switching means for switching the control signals to the appropriate screen.

The switching means are formed by a switch actuated by the operator of the display device (or automatically following a particular event) and relays which receive the signals of the information to be displayed and direct them towards one or other screen depending on the position of the switch.

Preferably, each circuit controlling the display of the information to be displayed includes a decoder circuit disposed in the vicinity of the associated screen in the case and a system for processing the information to be displayed disposed at a distance from said case.

BRIEF DESCRIPTION OF THE DRAWINGS

Other features and advantages of the present invention will be clear from the following description of a particular embodiment, said description referring to the accompanying drawings in which:

FIG. 1 shows an isometric projection of a case whose front face is used as display face for normal operation;

FIG. 2 is an isometric projection of the same case but whose top face is used as emergency mode display face after pivoting;

FIG. 3 is a functional diagram of the electronic circuits for displaying the information on the screens.

DESCRIPTION OF THE PREFERRED EMBODIMENT

The invention will be described in an application using liquid crystal flat screens but it may be used for flat screens formed using other technologies.

The display device of the invention includes (FIGS. 1 and 2) a right-angled parallelepipedic shaped box 1 with six sides 2, 3, 4, 5, 6, and 7 and which is disposed on a support, not shown, having slides such as the one referenced 9. In the normal position, box 1 is inside support 9 so that side 2 forms the front display face which is shown in FIG. 1. The side faces 6 and 7 which, in normal operation, are inside the support, each have a roller such as the one referenced at 17 fixed to face 6 and cooperating with slide 9. This normal operation display face 2 includes a liquid crystal matrix 10 (FIG. 3) for displaying information, concerning variables such as the vertical speed the altitude, etc...; and a framework 11 for carrying indications 12 giving the meaning of the information (FUEL/ENGINE, FLIGHT CONTROL ...). Should a major failure occur of one of the important elements of the aircraft, it is provided for only certain information to be displayed; that absolutely necessary for controlling the aircraft. Thus it is for the information which is displayed on the front display face 2 of FIG. 1 but other complementary information must be added thereto which, under normal operation, appears on conventional type dials.

The present invention proposes displaying such indispensable information by means of a second flat screen which forms the upper side 3 of box 1. FIG. 2 shows one embodiment of this second flat screen on which are to be found the same information concerning variables as that displayed on the screen disposed on the front face 2 (FIG. 1) but on which other visual information has been added in the form of dial images. Furthermore, the meanings of the variables are indicated not by the screen properly speaking but by a framework similar to framework 11 of FIG. 1.

Thus this second screen comprises, like the first one, a liquid crystal matrix 13 which is associated with a plate 14 having openings or windows for causing parts of matrix 13 to appear which serve for displaying the variable information. This plate 14 has indications 15 showing the meanings of the variables which are displayed on the matrix, which indications are formed by any known means, for example by light emitting incrustations, or illumination from behind, or else by reflection.

Of course, the indications may be formed by means of the liquid crystal matrix itself, in which case framework 11 and plate 14 do not need to carry said indications and may be omitted to the extent that they do not cooperate in the mechanical strength of the case.

To use this second screen, the operator must pull box 1 forward so that it slides on the slides. At the end of travel, box 1 pivots downwards about roller 17 so that the second screen takes up a vertical position facing the operator. Instead of being positioned vertically by the operator, it may be positioned automatically when a particular event happens such as a failure of the power supply means.

The electronic circuits which are directly associated with the flat screens 10 and 13 include a first decoder circuit 21 for screen 10 and a second decoder circuit 22 for screen 13. Each screen 10 or 13 is illuminated respectively by an illumination device 23 or 24 and heated respectively by a heating device 25 or 26 associated with a thermostat 65 or 66 so that the operating screen has a temperature always greater than the minimum operating temperature of the liquid crystals.

These different elements and devices 21, 22, 23, 24, 25, 26, 65 and 66 are connected to circuits 20 providing the different signals which are required for displaying on the screens by means of single or multiple conductors 27, 28, 29, 30, 31, 32 and 67 and 68 and relays 33, 34, 35 and 69. Relays 33 and 34 are connected in series so that the multiple conductor 27 is connected to the terminal 36 of case 1 by contacts 38 and 39 in one position of the relay and so that the multiple conductor 28 is connected to terminal 37 by contacts 40 and 41 in another position of the relays. Relay 33 is controlled by a switch 42 which is actuated when the operator uses the emergency mode display face, e.g. by pulling it so as to place it in a reading position. This switch is also connected to an output terminal 43. Relay 34 is controlled by circuits 20 by means of signals received at terminal 48.

Relay 35 has a terminal 44 which is connected to the illumination device 23 and a terminal 45 which is connected to the illumination device 24 whereas the common terminal 46 is connected to terminal 47 which is connected to the electric power supply. This relay, like relay 33, is controlled by switch 42.

Conductors 31 and 32 connect the thermostats 25 and 26 directly to the output terminals 51 and 52 of case 1.

Conductors 67 and 68 connect the heating devices 25 and 26 respectively to terminal 54 through relay 69 one terminal 70 of which is connected to conductor 67, another terminal 71 of which is connected to conductor 68 and a common terminal of which is connected to terminal 54. Like relays 33 and 35, relay 63 is controlled by switch 42.

The different electronic circuits described briefly with reference to FIG. 3 are fed by a conductor 49 connected to terminal 50 but the different connections inside case 1 have not been shown in the diagram.

Under normal operation, the contacts of relays 33, 34, 35, and 69 have the position shown in FIG. 4; when the operator actuates switch 42, either directly or by manipulating the emergency screen, the contacts of the relays take up the other position, either under the direct action of said switch for relays 33, 35 and 69 or through circuits 20 which deliver a signal to terminal 48.

Circuits 20 for elaborating the different display signals on the screen, called interfaces, are also described with reference to FIG. 3 in which only the elements required for understanding the invention have been shown. These circuits include essentially two identical processing systems 59 and 60 which operate permanently and in parallel and provide a redundancy for improving the operating safety. These two systems 59 and 60 provide the signals which are applied to the decoder circuits 21 and 22 through terminals 36 and 37. These output signals are representative of measurement signals of analog type or not which are delivered by the measuring instruments disposed in different positions in the aircraft. These measurement signals are applied simultaneously by conductors 70 to each of the systems 59 and 60 which transform them into signals usable by the decoder circuits 21 and 22.

The systems 59 and 60 are available commercially and are generally sold in association with the screen. Of course, certain adaptations may be made thereto, particularly in so far as their programming is concerned.

The interface 20 further includes an electric power supply 61, a device 62 for regulating the heating of the screens and an illumination control device 63, these elements being preferably disposed in the interface 20 because they are too bulky to be placed in the display case 1. Elements 61, 62, 63 are connected to terminal 50 for element 60, to terminals 51, 52 and 54 for element 62 and to terminal 47 for element 63, of the display case.

It should be noted that the thermostats 65 and 66 are connected permanently to the heating regulation device 62 so as to supply the temperature information whereas only the heating device which is associated with the operating screen is connected to the regulation device 62 through the use of relay 69 for receiving the heating current.

Furthermore, the electronic circuits and the screens are permanently biased by circuit 61 and conductor 49 so as to avoid the harmful effects of sudden switching during an operating mode change.

The circuits shown in FIG. 3 operate as follows. In the normal position, this system 59 delivers the signals for controlling the display on screen 10 through terminal 36, relays 34 and 33, the multiple conductor 27 and the decoder circuit 21. Only the illumination device 23 is fed by device 63 through terminal 47, relay 35 and conductor 29. Similarly, only the heating device 25 is fed by the regulation device 62 via terminal 54, relay 69 and conductor 67.

In the emergency mode, through the effect of switch 42 on relays 33, 35 and 69, the systems 60 or 59 deliver the display control signals for screen 13 through terminal 37, relays 34 and 33, the multiple conductor 28 and the decoder circuit 22. Furthermore, only the illumination device 24 is fed via relay 35 and conductor 30 and only the heating device 26 is fed via relay 69 and conductor 68.

Relay 34 only switches to the other position if the system 59 breaks down so that the control signals come then from system 60.

Of course, when case 1 is put back in position in slides 9, switch 42 actuates relays 33, 35 and 69 for again switching the signals towards screen 10 and the associated devices.

The particular embodiment which has just been described comprises a case two of the six sides of which are each formed by a flat display screen. Under normal operation, a single screen, that of the front face 2, is operating and in the emergency mode only the screen of the top face 3 is operating. The arrangement of the electronic circuits of the screen is provided for improving safety, more particularly by doubling the control system. The electric consumption has been reduced by supplying the electronic circuits and the screens with power only for biassing them and by only heating the screen during operation. By limiting the number of circuits in the vicinity of the screens, as small a case volume as possible is obtained, the bulky elements being disposed in a position where the available volume is greater.

It is clear that the invention also covers those instances where more than two sides of the case are used for supporting the flat screens, the case then being pivotally mounted in a mechanical device causing the side, and so the screen, to appear which the operator chooses or which the central system wishes to present to the operator. Of course, such arrangements imply in particular an appropriate mechanical device for supporting the case but also a more complicated switching device for switching the display signals to the correct screen.

What is claimed is:

1. A device for displaying information to an operator of an aircraft, said information contained in digital display signals output from an external processor, comprising:
   a parallelepipedic shaped case having four sides;
   means for fixing and pivotally mounting said case to present one of two display sides of said case to said operator;
   first electronic display means for displaying a first plurality of aircraft information on said first display side of said case;
   second electronic display means for displaying said first plurality of information and a second plurality of information on said second display side of said case;
   means for inputting said digital display signals from said external processor; and
   means for switching said input digital display signals to one of said first electronic display means and second electronic display means, said switching means also outputting a switching signal to said external processor so that digital display signals corresponding to one of said first plurality of information and said combined first and second plurality of information are output by said processor, depending on the position of said switching means.

2. A device according to claim 1 wherein each of said first and second electronic display means include a decoder circuit.

3. A device according to claim 1 wherein said switching means is automatically actuated following the occurrence of a particular predetermined event.

4. A device according to claim 3 wherein said predetermined event is a failure of said first electronic display means.

5. A device according to claim 1 wherein said switching means is manually actuated by the operator.

6. A device according to claim 1 wherein said first and second plurality of information together contain information necessary for said operator to pilot said aircraft.

* * * * *